United States Patent [19]

Hiyoshi et al.

[11] 4,446,273
[45] May 1, 1984

[54] AQUEOUS DISPERSIONS OF VINYLIDENE CHLORIDE RESINS

[75] Inventors: Kazuhiko Hiyoshi; Norio Matsuura; Michiharu Matsuguchi, all of Nobeoka; Norio Onofusa; Tadao Nishikage, both of Yokohama, all of Japan

[73] Assignee: The Dow Chemical Company, Midland, Mich.

[21] Appl. No.: 415,853

[22] Filed: Sep. 8, 1982

Related U.S. Application Data

[63] Continuation of Ser. No. 270,060, Jun. 3, 1981, abandoned.

[51] Int. Cl.$^3$ .............................................. C08L 31/00
[52] U.S. Cl. ..................................... 524/556; 524/560; 524/561
[58] Field of Search .......................... 524/556, 560, 561

[56] References Cited

U.S. PATENT DOCUMENTS

| | | | |
|---|---|---|---|
| 3,041,208 | 6/1962 | Hay et al. .......................... | 117/138.8 |
| 3,058,939 | 10/1962 | Meier ................................... | 524/161 |
| 3,449,302 | 6/1969 | Nachbur et al. .................... | 526/256 |
| 3,696,082 | 10/1972 | Smith ................................... | 428/510 |
| 3,736,303 | 5/1973 | Smith et al. ......................... | 526/240 |
| 3,946,139 | 3/1976 | Bleyle et al. ........................ | 428/518 |

*Primary Examiner*—Joseph L. Schofer
*Assistant Examiner*—Bernard Lipman
*Attorney, Agent, or Firm*—D. R. Howard

[57] ABSTRACT

An aqueous dispersion of a vinylidene chloride resin which, when coated onto a synthetic resinous film substrate, has the combined properties of: (1) good adhesion to the substrate; (2) good adhesion of a printing ink to the coating; (3) satisfactory barrier to gases (especially oxygen) and water vapor; and (4) a high resistance to a boiling water treatment. The dispersion must also contain an unsaturated carboxylic acid in an amount of from about $0.5 \times 10^{-4}$ to about $4 \times 10^{-4}$ mol of unsaturated carboxylic acid units per gram of solids in the dispersion. The unsaturated carboxylic acid must have a partition coefficient of greater than or equal to 1. A limited portion of the amount of the unsaturated carboxylic acid is contained in the aqueous phase. The remaining unsaturated carboxylic acid is polymerized with the vinylidene chloride.

2 Claims, No Drawings

AQUEOUS DISPERSIONS OF VINYLIDENE CHLORIDE RESINS

This is a continuation of application Ser. No. 270,060, filed June 3, 1981, now abandoned.

DETAILED DESCRIPTION OF THE INVENTION

The present invention relates generally to an aqueous dispersion of a vinylidene chloride resin. More particularly, the present invention relates to an aqueous dispersion which has good adhesive properties and which is capable of providing a coating having an improved printability, excellent barrier properties to gases (especially to oxygen) and water vapor as well as a high resistance to boiling water treatment.

As is well-known, vinylidene chloride homopolymers have an intrinsically high degree of crystallinity. It is believed that the high degree of crystallinity is a result of regularity and symmetry of vinylidene chloride homopolymer chemical structures. It is also known that vinylidene chloride homopolymers generally cannot be dissolved in known solvents. It is further known that vinylidene chloride homopolymer melting points are generally very high. Accordingly, it is difficult either to extrude molten homopolymers of vinylidene chloride into a film or to dissolve vinylidene chloride homopolymers in a solvent for coating purposes, particularly on a commercial scale. It is further known that in an aqueous dispersion of a vinylidene chloride homopolymer, particles of the homopolymer have a high tendency to agglomerate. It is therefore difficult to obtain a transparent continuous coating from such a dispersion. Because of the foregoing, it is now a common practice, in order to obtain a film grade or coating grade vinylidene chloride resin, to copolymerize vinylidene chloride with a minor amount of one or more monomers copolymerizable therewith. Illustrative copolymerizable monomers include vinyl chloride, methyl acrylate, acrylonitrile, methyl methacrylate and so forth. It is believed that addition of a comonomer causes a partial breaking of the regularity of the chemical structure of the resultant copolymer.

Films obtained by extruding molten vinylidene chloride copolymer resins are now highly valued as packaging materials. Such films are valued because they generally have superior gas and water vapor barrier properties as compared with other resin films. However, up to 10 percent by weight of plasticizers, thermal stabilizers, and other additives are inevitably added to a vinylidene chloride copolymer resin to suppress thermal decomposition thereof when the resin is melted and extruded at extrusion processing temperatures. Such temperatures are generally in the range of from about 150° C. to 250° C. The gas and water vapor barrier properties of extruded films containing such additives are generally reduced from the barrier properties of the vinylidene chloride resin without such additives.

As an alternative to extrusion, a solution of a vinylidene chloride copolymer resin is generally coated onto other resin films to improve the gas and water vapor barrier properties of such films. For obtaining such a coating solution, the vinylidene chloride copolymer resin is either dissolved in an organic solvent or dispersed in water. Coating solutions of aqueous dispersion type are now used more commonly than organic solvent type coating solutions because of safety, hygiene, and economic considerations. Film coatings prepared in accordance with the present invention and deposited from such aqueous vinylidene chloride copolymer coating solutions show improved gas and water vapor barrier properties when compared to films of similar thickness prepared from the same vinylidene chloride copolymers formulated for, and prepared by, extrusion processing.

An aqueous dispersion of a vinylidene chloride resin may be obtained by emulsion-copolymerizing vinylidene chloride monomer with a minor amount of one or more ethylenically unsaturated monomers copolymerizable therewith in an aqueous polymerization medium. The aqueous polymerization medium comprises water, an emulsifying agent, a polymerization initiator and, as required, an electrolyte for controlling resin particle size. Other additives for conditioning the aqueous dispersion system or similar purposes may also be added. Following polymerization, non-reacted residual monomers are removed. Following monomer removal, a suitable amount of a surfactant is added to improve the time-dependent colloid stability of the resultant aqueous dispersion.

The aqueous vinylidene chloride copolymer resin dispersion of the present invention are suitably applied as coatings on films formed from other resins such as polyethylene, polypropylene, polyester, nylon, and polyvinyl chloride, etc. The dispersions are applied either directly onto a film surface or onto an anchor coat previously applied to a resin film. The aqueous vinylidene chloride copolymer resin dispersion must adhere sufficiently to such other resin films or prime coats. Also, since product data or other information are frequently printed on film packages, a coating of an aqueous vinylidene chloride copolymer resin dispersion which is applied to the packages must have adequate printability. Further, many foods or the like products are now sold as hermetically packed in coated film bags. Some foods require sterilization through boiling water after being hermetically packed. Thus, coated films for such an application must have a high boiling water resistance. That is to say, such coated films must be capable of withstanding a boiling water treatment with only a minimum reduction in their gas barrier properties.

Heretofore, for improving the aforementioned adhesive properties of coatings of aqueous vinylidene chloride copolymer resin dispersions to other resin films or anchor coats as well as the printability of such coatings, a minor amount of one or more unsaturated carboxylic acids such as acrylic acid, methacrylic acid, itaconic acid, crotonic acid, etc., has been polymerized with vinylidene chloride in addition to the aforementioned monomer or monomers copolymerizable therewith. However, such an addition of one or more unsaturated carboxylic acids generally tends to reduce the gas and water vapor barrier properties and the boiling water resistance of the resultant coatings, although the aforementioned adhesive properties and printability are certainly improved thereby.

Thus, it is highly desired now in this field of the art to improve the gas and water vapor barrier properties and the boiling water resistance of such aqueous vinylidene chloride resin dispersion coatings while maintaining the adhesive properties and printability of such coatings at acceptable or higher levels.

In the course of studies to achieve such improvements, the inventors supposed that, in an aqueous vinylidene chloride resin dispersion obtained by emulsion polymerizing of vinylidene chloride together with minor amounts of one or more monomers copolymerizable therewith and one or more unsaturated carboxylic acids, the unsaturated carboxylic acids input might not entirely taken in the copolymer chains constituting the vinylidene chloride copolymer particles of the aqueous dispersion, but might exist separately as homo- or copolymers in a goodly amount in the water phase of the aqueous dispersion. It was further supposed that such polymers containing the unsaturated carboxylic acid units might be highly effective to improve the gas and water vapor barrier properties of the coating of the aqueous vinylidene chloride resin dispersion as well as the boiling water resistance of such a coating. Based on this hypothesis, the research works were continued to reveal that an aqueous dispersion of a vinylidene chloride resin can form a coating having improved gas and water vapor barrier properties as well as a high boiling water resistance only when it contains a specific quantitative range of one or more unsaturated carboxylic acids with selected properties. One such property is that out of the unsaturated carboxylic acid content, a quantity existing in a form titratable with a 1/20 N aqueous solution of sodium hydroxide must not exceed a specific upper limit in terms of the carboxyl group content.

That is to say, the present invention provides an aqueous dispersion of a vinylidene chloride copolymer resin comprising: (a) from about 83 to about 93 percent by weight, based on the solid content of the aqueous dispersion, of vinylidene chloride units; (b) from about 17 to about 7 percent by weight, based on the solid content of the aqueous dispersion, of one or more ethylenically unsaturated monomers copolymerizable therewith; and (c) from about $0.5 \times 10^{-4}$ to about $4 \times 10^{-4}$ mol of unsaturated carboxylic acid units in terms of the carboxyl group content per gram of the solids in the aqueous dispersion, said unsaturated carboxylic acid having a partition coefficient of 1 or more in a vinylidene chloride-water system at 30° C.; with the further limitation that out of said unsaturated carboxylic acid content the quantity existing in a form titratable with a 1/20 N aqueous solution of sodium hydroxide does not exceed either about $1.5 \times 10^{-4}$ mol in terms of the carboxyl group content per gram of the solids in the aqueous dispersion or 60 percent of the total carboxyl group content in said aqueous dispersion, whichever is smaller.

According to the present invention, the aqueous vinylidene chloride resin dispersion has polymerized therein an amount of vinylidene chloride, the amount of vinylidene chloride being from about 83 to about 93 percent by weight, based on the solid content of the aqueous dispersion. More preferably, the amount of vinylidene chloride is from about 86 to 91 percent by weight based on the solid content of the aqueous dispersion. If the amount of vinylidene chloride is less than 83 percent by weight, a coating of the resultant aqueous dispersion will have reduced gas and water vapor barrier properties. If the amount of vinylidene chloride is greater than 93 percent by weight, the resultant aqueous dispersion will not only come to show a tendency to coagulate as time elapses, but will tend not to form a continuous transparent coating.

Also, according to the present invention, in order to impart to the aqueous vinylidene chloride resin dispersion coating improved adhesion, either to a base film or to an anchor coat applied to a base film, improved printability with ink, the aqueous vinylidene chloride resin dispersion must also contain a total amount of an unsaturated carboxylic acid. The total amount of the unsaturated carboxylic acid in the aqueous dispersion is from about $0.5 \times 10^{-4}$ to about $4 \times 10^{-4}$ mol and, more preferably, from about $1 \times 10^{-4}$ to about $4 \times 10^{-4}$ mol based on carboxyl group content per gram of the solids in the aqueous dispersion.

If the aforesaid total content of the unsaturated carboxylic acid exceeds $4 \times 10^{-4}$ mol based on carboxyl group content per gram of the solids in the aqueous dispersion, the resultant aqueous dispersion does not form a coating having desired gas and water barrier properties as well as a desired boiling water resistance. Even if the total content of the unsaturated carboxylic acid is in the range of $0.5 \times 10^{-4}$ to $4 \times 10^{-4}$ mol in terms of the carboxyl group content per gram of the solids in the aqueous dispersion, such desired barrier properties and boiling water resistance cannot be obtained unconditionally. The desired barrier properties and boiling water resistance can be obtained only when two conditions are met. First, the total content of the unsaturated carboxylic acid must be less than about $4 \times 10^{-4}$ mol based on carboxyl group content per gram of the solids in the aqueous dispersion. Second, out of said total content, a portion of the unsaturated carboxylic acid must exist in a form titratable with a 0.5 Normal (N) aqueous solution of sodium hydroxide. The portion of the unsaturated carboxylic acid existing in a form titratable with a 0.5 N aqueous solution of sodium hydroxide must not exceed a value which is the smaller of (a) about $1.5 \times 10^{-4}$ mol based on carboxyl group content per gram of solids in the aqueous dispersion; or (b) about 60 percent of the total unsaturated carboxylic acid content. In this respect, if the total content of the unsaturated carboxylic acid is a large amount, a value of about 60 percent of the total unsaturated carboxylic acid content is greater than a value of about $1.5 \times 10^{-4}$ mol based on carboxyl group content per gram of the solids in the aqueous dispersion. In such a case, the latter value gives an upper limit on the portion of the unsaturated carboxylic acid which may exist in a form titratable with a 1/20 N aqueous solution of sodium hydroxide according to the present invention. Further, even if the aforementioned two conditions concerning the total content of the unsaturated carboxylic acid and the portion of the unsaturated carboxylic acid existing in a form titratable with a 1/20 N aqueous NaOH solution are satisfied, it has been found that the resultant aqueous dispersion cannot form a coating having desired or satisfiable gas and water vapor barrier properties and boiling water resistance, unless the unsaturated carboxylic acid used is one having specific properties. That is to say, it does not follow that any of unsaturated carboxylic acids commonly used in the production of aqueous dispersions of vinylidene chloride resins will produce satisfactory results in accordance with the present invention. It has been found that only those unsaturated carboxylic acids which show a higher affinity for vinylidene chloride than for water in an emulsion polymerization process will produce satisfactory results. Those unsaturated carboxylic acids having a partition coefficient of 1 or more as calculated by the following formula are effective for producing satisfactory results in accordance with the present invention in terms of improved gas and water vapor barrier properties as well as the boiling water resistance of the aqueous vinylidene chloride resin dispersion coating:

$$\text{Partition coefficient} = \frac{4\text{ g} - \begin{pmatrix}\text{Quantity of unsaturated carboxylic}\\ \text{acid dissolved in water}\end{pmatrix}}{\text{Quantity of unsaturated carboxylic acid dissloved in water}}$$

where 4 g is the total quantity of an unsaturated carboxylic acid and the quantity of the unsaturated carboxylic acid dissolved in water is determined by the method to be described herein later.

A preferred example of such unsaturated carboxylic acids having a partition coefficient of 1 or more is methacrylic acid as seen from the following Table I which shows partition coefficients of typical unsaturated carboxylic acids:

TABLE I

| Partition Coefficients | |
|---|---|
| Acrylic Acid | 0.25 |
| Itaconic Acid | 0.22 |
| Methacrylic Acid | 2.00 |

As the aforementioned monomers to be copolymerized with vinylidene chloride and unsaturated carboxylic acids in the present invention, any of vinyl type or di-α,α-substituted ethylene type monomers copolymerizable therewith may be used. However, the preferred monomers are those with substituted groups having a small number of carbon atoms. Illustrative preferred monomers include methyl acrylate, ethyl acrylate, acrylonitrile, methyl methacrylate, ethyl methacrylate, methacrylonitrile and so forth. Although types of additives such as emulsifying agents, polymerization initiators and surfactants are not specifically limited according to the present invention, it is preferred to minimize amounts of such additives where practicable. It is believed that such additives remain in the coating formed from the aqueous dispersion. It is further believed that such additives have a rather adverse effect on the gas and water vapor barrier properties and boiling water resistance of the coating.

Hereinafter, the present invention will be illustrated further by the following examples and the accompanying comparative (or reference) experiments. In these examples and comparative experiments, the effects of the present invention were evaluated in terms of the properties and parameters to be described hereinbelow. Also, all parts and percentages used herein are given on a weight basis unless otherwise specified. The examples and accompanying comparative (or reference) experiments are not to be taken as limiting the present invention.

(A) PARTITION COEFFICIENT

To a 300 milliliter three-necked flask equipped with a stirrer, thermometer and a dry ice-methanol cooled reflux condenser, 100 grams of vinylidene chloride monomer containing 100 parts per million (ppm) of 2,6-tert-butyl-p-cresol as a polymerization inhibitor, 100 grams of deionized water and 4 grams of an unsaturated carboxylic acid were added and agitated slowly at 30±1 degrees C. in a flowing nitrogen gas atmosphere. When these were mixed well, agitation was suspended to allow the resultant mixture to be parted into water and vinylidene chloride phases. An amount of the water phase was then sampled and titrated with a 1/20 N aqueous sodium hydroxide solution in the presence of phenolphthalein. The quantity of the unsaturated carboxylic acid dissolved in the water phase was then determined based on the titration. The partition coefficient of the unsaturated carboxylic acid was obtained from the following formula:

$$\text{Partition coefficient} = \frac{4\text{ g} - \begin{pmatrix}\text{Quantity of unsaturated carboxylic}\\ \text{acid dissolved in water}\end{pmatrix}}{\text{Quantity of unsaturated carboxylic acid dissloved in water}}$$

As understood from the above formula, the larger the partition coefficient is, the greater affinity the unsaturated carboxylic acid shows to vinylidene chloride.

(B) CHLORINE CONTENT

The content of the vinylidene chloride in an aqueous vinylidene chloride resin dispersion was determined by measuring chlorine content of the solids in the aqueous dispersion. A sample amount of the aqueous dispersion was dissolved in warm methanol and heavily stirred to break its colloidal state. A precipitate resulted which was then separated by filtration, washed and dried for use as a test sample. To determine chlorine content of the test sample, the test sample was subjected to an analysis substantially in accordance with Shöniger's oxygen flask combustion method as set forth in JIS K 6722.

(C) SOLID CONTENT

A sample aqueous vinylidene chloride resin dispersion was accurately weighed on an accurately weighed aluminum foil tray in an amount close to 1 gram and allowed to dry in a circulating hot air dryer at 120° C. for 30 minutes. Sample weight loss was then measured to determine the solid content of the aqueous dispersion.

(D) CARBOXYL GROUP CONTENT

The carboxyl group content in an aqueous vinylidene chloride resin dispersion was determined according to a conductometric titration with a conductometric analyzer, Model E 365B (Metrohm). Samples were prepared and titrated in the following manner.

Titration A—Carboxyl Group Content in Aqueous Dispersion

The aqueous vinylidene chloride resin dispersion was dissolved in 100 grams of dimethylformamide in an accurately weighed quantity close to 1 gram. The resultant solution was titrated with a 1/10 N dimethylformamide solution of cobalt acetate.

Titration B—Carboxyl Group Content Titratable with NaOH Solution

The aqueous vinylidene chloride resin dispersion in an accurately weighed quantity close to 2 grams was diluted with 110 milliliters of deionized water. The diluted aqueous vinylidene chloride resin dispersion was titrated with a 1/20 N aqueous sodium hydroxide solution.

(E) Preparation of Coated Film

An oriented polypropylene film or polyester film subjected to corona discharge treatment was coated with a primer (equivalent to an anchoring agent, EL 220 produced by Toyo Ink Mfg. Co., Ltd.) at a rate of about 0.2 gram/m², followed by drying. Then, aqueous vinylidene chloride resin dispersions were applied on the dried primer coated film samples at a rate of 5 grams/m² with a Mayer rod. The resultant coatings were dried in a circulating hot air dryer at 100° C. for 30 seconds.

(F) Adhesiveness to Substrates

An adhesive tape (Cellotape 12 millimeters wide, produced by Nichiban Co., Ltd.) was stuck onto a coated film immediately after it was prepared in the manner as described in the preceding paragraph (E). Subsequently, the adhesive tape was rapidly torn off. As a result of this tearing, a coated film having its coating torn off by the tape was evaluated as unacceptable, and a coated film having a coating which could withstand the stripping was evaluated as acceptable.

(G) Applied Printing Ink Adhesion

A coated film prepared in the manner as described in the paragraph (E) was allowed to stand in a thermostatic oven at 60° C. for 24 hours after preparation. Then, it was coated with white GNC ink (produced by Toyo Ink Mfg. Co., Ltd.) by means of a Mayer rod. After 30 seconds of drying at 60° C., an adhesive tape (Cellotape produced by Nichiban Co., Ltd.) was stuck onto the ink coating. Then, the adhesive tape was rapidly torn off. An area where the ink remained without being torn off by the tape was visually determined and shown in Table II in terms of percentage of the total area of the ink coating.

(H) Oxygen Permeability

An oriented polypropylene film, 22 microns thick, coated in the manner as described in the previous paragraph (E) was allowed to stand for two days at room temperature at a relative humidity of 100 percent or treated in boiling water (see paragraph J). After the two days elapsed or immediately after the boiling, the oxygen permeability of the coated film was measured with an oxygen permeability tester, OX-TRAN 100 (Modern Control) at 20° C. and at a relative humidity of 100 percent. The film samples were coated at a rate of 5 grams/m².

(I) Water Vapor Permeability

An oriented polyester film 12 microns thick was coated according to the method described under paragraph (E). The water vapor permeability of the film thus coated was determined under JIS Z 0208. Test samples such as the aqueous dispersion coated film are evaluated for water vapor permeability is measured under conditions so severe (i.e., at a relative humidity of 90 percent at 40° C. under the JIS test method) that whether the permeability is great or small an indication of the water resistance of coatings on the film is obtained.

(J) Boiling Water Treatment

A coated film wrapped in cotton gauze was immersed for 30 minutes in water boiling at a temperature in the range of from about 95° to about 100° C. After being taken out of the boiling water, the coated film was put between filter paper sheets to absorb water drips deposited on its surface.

In the following examples and references, all parts and percentages are to be understood as being on a weight basis unless otherwise specified.

EXAMPLE 1

A. A monomer mixture consisting of 92.5 parts of vinylidene chloride, 5 parts of acrylonitrile and 2.5 parts of methyl methacrylate and 0.6 part of methacrylic acid was prepared.

B. In 100 parts of deionized water were dissolved 0.1 part of sodium dodecylbenzenesulfonate and 0.3 part of potassium persulfate to obtain an aqueous solution.

C. All of the aqueous solution and 10 percent of the monomer mixture were charged into a pressure glass tube in which air was replaced by nitrogen gas. The glass tube was then sealed. The resultant mixture was subjected to polymerization at a temperature of about 50° C. for 6 hours.

D. The glass tube was then opened and 0.65 part of sodium alkylbenzenesulfonate and the rest (90%) of the monomer mixture were added to the tube. The tube was then resealed. The resultant mixture was subjected to polymerization for 24 hours at 50° C. to form an aqueous dispersion.

E. The glass tube was then opened and sodium dodecylbenzene sulfonate was added in such a quantity as to adjust the surface tension of the dispersion to about 42 dyne/cm as measured at 20° C. with a Du Noüy tensiometer.

F. Steam was blown into the aqueous dispersion at a rate of 0.4 percent per hour based on the quantity of the dispersion under such a reduced pressure that the temperature might be kept at 60° C. As a result, unreacted vinylidene chloride monomer was removed from the aqueous dispersion to such an extent that its content became not more than about 10 ppm in the dispersion.

EXAMPLE 2

Except that the methacrylic acid quantity was increased to 2 parts, the same procedure as in Example 1 was repeated.

EXAMPLE 3

Except that the methacrylic acid quantity was increased to 3 parts, the same procedure as in Example 1 was repeated.

REFERENCE 1

Except that no methacrylic acid was added, the same procedure as in Example 1 was repeated.

REFERENCE 2

Except that the methacrylic acid quantity was increased to 4 parts, the same procedure as in Example 1 was repeated.

REFERENCE 3

Except that 0.6 part, 1 part, 2 parts and 3 parts of acrylic acid were added respectively instead of 0.6 part of methacrylic acid, the same procedure as in Example 1 was repeated.

REFERENCE 4

Instead of the two-stage polymerization process as in Example 1, a one-stage batch emulsion polymerization process was employed. That is to say, the same materials as those used in Example 3 were used except for further addition of 2 parts of sodium dodecylbenzenesulfonate for securing the stability. The materials were polymerized in a sealed glass tube at 50° C. for 30 hours and then, unreacted residual monomers were removed in the same manner as in Example 1.

REFERENCE 5

A so-called "cap" polymerization process was adopted, in which unlike the foregoing examples a carboxylic acid was not mixed with the mixture of vinylidene chloride and other monomers. That is to say, polymerization was accomplished in the absence of a carboxylic acid as in Reference 1. A carboxylic acid was then added and a further polymerization was conducted. The process is detailed as follows.

A. A monomer mixture was prepared of 92.5 parts of vinylidene chloride, 5 parts of acrylonitrile and 2.5 parts of methyl methacrylate (totaling to 100 parts).

B. An aqueous solution was prepared by dissolving 0.1 part of sodium dodecylbenzenesulfonate and 0.3 part of potassium persulfate in 100 parts of deionized water.

C. The whole of the aqueous solution and 10 percent of the monomer mixture were sealed in a pressure glass tube having a nitrogen gas atmosphere therein and polymerized at 50° C. for 6 hours.

D. The glass tube was then opened, and 0.65 part of a sodium alkylbenzenesulfonate and all of the remaining monomer mixture (90%) were added to the glass tube. After sealing the glass tube again, its content was further subjected to polymerization at 50° C. for 24 hours. Up to this step, the process is the same as that in Reference 1. Then, the following steps were further applied:

E. The glass tube was opened to add 1.0 part of methacrylic acid to its content, followed by sealing and by polymerization at 50° C. for additional 8 hours.

F. The resultant aqueous dispersion was subjected to the same treatments as those in the steps E and F of Example 1.

EXAMPLE 4

A. A monomer mixture was prepared by adding 2 parts of methacrylic acid to a mixture made up of 93 parts of vinylidene chloride and 7 parts of methyl acrylate.

B. An aqueous solution was prepared by dissolving 0.1 part of sodium dodecylbenzenesulfonate and 0.1 part of potassium persulfate in 100 parts of deionized water.

C. The whole of the aqueous solution and 10 percent of the monomer mixture were charged in a pressure-resistant glass-lined reactor, and stirred while keeping the temperature therein at 50° C. When the polymerization of the monomer was almost completed which could be found out by observing the change in the internal pressure of the reactor, 0.65 part of sodium lauryl sulfate was added in the reactor as a 10 percent aqueous solution. Following addition of the sodium lauryl sulfate, the whole of the remaining monomer mixture (90%) was slowly added to the reactor content at such a rate that the addition is accomplished over a period of 10 hours.

D. After completion of the reaction, sodium lauryl sulfate was added to the resultant aqueous dispersion to adjust its surface tension to 42 dyne/cm (at 20° C.) as in part E of Example 1.

E. Unreacted residual monomers were removed in the same manner as in Example 1, part F.

REFERENCE 6

Except that 1.7 parts of acrylic acid was added instead of 2 parts of methacrylic acid, the same procedure as in Example 4 was repeated.

REFERENCE 7

Except that 1.5 parts of itaconic acid was added instead of 2 parts of methacrylic acid, the same procedure as in Example 4 was repeated.

These examples and references are summarized in Table II which follows together with the results of tests on their products. A comparison of Reference 1 with Examples 1, 2 and 3 indicates that desirable adhesiveness could not be obtained unless a carboxylic acid was used. In References 2, 4 and 5 it was found that the quantity of the carboxyl group content titratable with aqueous sodium hydroxide exceeded $1.5 \times 10^{-4}$ mol/gram. It was also found that the water vapor permeability which is a measure for water resistance could not be limited to a level below 10 grams/m²/24 hours that is desirable for practical use if a carboxylic acid was (1) added in an excessive quantity; or (2) improperly introduced to the aqueous dispersion in spite of the added carboxylic acid being the one like methacrylic acid having a partition coefficient of not less than 1. From Reference 3 it is noted that desired printed ink adhesiveness could not be obtained if carboxyl group content was limited to a level within the range for desirable water resistance. On the other hand, desired water resistance could not be obtained if carboxyl group content was increased to a level within the range required for satisfactory printed ink adhesiveness. It is important to note that acrylic acid, a carboxylic acid having the partition coefficient of not more than 1, was used in Reference 3. Acrylic acid has been frequently employed in preparing known aqueous vinylidene chloride resin dispersions. In other words, it is clearly effective to limit the amount of carboxyl groups distributed in the water phase of an aqueous vinylidene chloride copolymer dispersion to a particular level by the use of a carboxylic acid such as methacrylic acid which has greater affinity for vinylidene chloride than for water. By so limiting the amount of carboxyl groups in the water phase, one is able to achieve satisfactory adhesiveness, both to a film and a prime coat, satisfactory printed ink adhesiveness, high gas and water vapor barrier properties and excellent water resistance at the same time. References 6 and 7 show performances almost equivalent to those of Example 4 so long as physical properties evaluation items except boiling water treatment are concerned. Differences in oxygen permeability after the boiling water treatment clearly show that References 6 and 7 do not have a water resistance sufficient to satisfactorily withstand a boiling water treatment. This clarifies the superiority of the present invention.

TABLE II

| Examples & | Unsaturated Carboxylic | Chlorine Content | Carboxylic Group Content In Aqueous Dispersion (Titration A) ($\times 10^{-4}$ mol per 1 g of | NaOH—Titratable Carboxylic Group Content (Titration B) ($\times 10^{-4}$ mol per 1 g of | Proportion of NaOH—titrated Carboxyl Group (B/A) |
| --- | --- | --- | --- | --- | --- |

TABLE II-continued

| References | Acid | (%) | Solid Content) | Solid Content) | (%) |
|---|---|---|---|---|---|
| Reference 1 | None | 66.9 | — | — | — |
| Example 1 | Methacrylic Acid | 66.6 | 0.7 | 0.4 | 57 |
| Example 2 | Methacrylic Acid | 65.7 | 2.2 | 1.0 | 45 |
| Example 3 | Methacrylic Acid | 65.0 | 3.2 | 1.4 | 44 |
| Reference 2 | Methacrylic Acid | 64.4 | 4.2 | 1.6 | 38 |
| Reference 3-1 | Acrylic Acid | 66.8 | 0.8 | 0.7 | 88 |
| Reference 3-2 | Acrylic Acid | 66.5 | 1.3 | 1.1 | 85 |
| Reference 3-3 | Acrylic Acid | 66.3 | 2.6 | 2.0 | 77 |
| Reference 3-4 | Acrylic Acid | 66.0 | 3.9 | 2.9 | 74 |
| Reference 4 | Methacrylic Acid | 65.6 | 3.2 | 2.6 | 81 |
| Reference 5 | Methacrylic Acid | 66.1 | 1.1 | 0.8 | 73 |
| Example 4 | Methacrylic Acid | 65.4 | 2.2 | 1.1 | 50 |
| Reference 6 | Acrylic Acid | 65.5 | 2.3 | 1.8 | 78 |
| Reference 7 | Itaconic Acid | 65.7 | 2.2 | 1.9 | 86 |

| Examples & References | Adhesiveness To Substrate | Printed Ink Adhesiveness | Oxygen Permeability ($cc/m^2/24$ Hrs) | Water Vapor Permeability ($g/m^2/24$ Hrs) | Oxygen Permeability After Boiling Water Treatment |
|---|---|---|---|---|---|
| Reference 1 | No Good | 0 | 3.7 | 6.3 | 7.4 |
| Example 1 | Good | 30~40 | 3.7 | 6.4 | 8.3 |
| Example 2 | Good | 70~80 | 4.8 | 7.5 | 9.9 |
| Example 3 | Good | 100 | 5.6 | 8.3 | 12.6 |
| Reference 2 | Good | 100 | 7.3 | 10.0 | 18.2 |
| Reference 3-1 | Good | 0~10 | 4.0 | 6.5 | 12.0 |
| Reference 3-2 | Good | 20~30 | 10.2 | 7.1 | 31.8 |
| Reference 3-3 | Good | 30~40 | 13.7 | 12.2 | — |
| Reference 3-4 | Good | 80~90 | 25.8 | 46.5 | — |
| Reference 4 | Good | 80~90 | — | 38.7 | — |
| Reference 5 | Good | 70~80 | 4.3 | 6.8 | 17.2 |
| Example 4 | Good | 100 | 7.6 | 6.4 | 13.9 |
| Reference 6 | Good | 80~90 | 8.5 | 7.3 | 21.2 |
| Reference 7 | Good | 80~90 | 8.7 | 7.5 | 21.8 |

What is claimed is:

1. An aqueous dispersion of a vinylidene chloride copolymer resin the copolymer resin consisting essentially of: (a) from about 83 to about 93 percent by weight, based on solid content of the aqueous dispersion, of vinylidene chloride; (b) from about 17 to about 7 percent by weight, based on the solid content of the aqueous dispersion, of one or more ethylenically unsaturated monomers copolymerizable therewith, the ethylenically unsaturated monomers being selected from the group consisting of methyl acrylate, ethyl acrylate, acrylonitrile, methyl methacrylate, ethyl methacrylate, and methacrylonitrile; and (c) from about $0.5 \times 10^{-4}$ to about $4 \times 10^{-4}$ mol of unsaturated carboxylic acid units in terms of the carboxyl group content per gram of solids in the aqueous dispersion, said unsaturated carboxylic acid having a partition coefficient of 1 or more in a vinylidene chloride-water system at 30° C. with the further limitation that out of said unsaturated carboxylic acid content the quantity of the unsaturated carboxylic acid existing in a form titratable with a 1/20 N aqueous solution of sodium hydroxide does not exceed either about $1.5 \times 10^{-4}$ mol in terms of the carboxyl group content per gram of the solids in the aqueous dispersion or 60 percent of the total carboxyl group content in said aqueous dispersion, whichever is smaller.

2. The aqueous dispersion of claim 1 wherein said unsaturated carboxylic acid is methacrylic acid.

* * * * *